United States Patent [19]
Paustian

[11] Patent Number: 6,111,237
[45] Date of Patent: *Aug. 29, 2000

[54] MICROWAVE FACILITATED ATMOSPHERIC ENERGY PROJECTION SYSTEM

[75] Inventor: Philip J. Paustian, Panama City, Fla.

[73] Assignee: Cerberus Institute for Research and Development, Inc., Warner Robins, Ga.; a part interest

[*] Notice: This patent is subject to a terminal disclaimer.

[21] Appl. No.: 09/065,454

[22] Filed: Apr. 24, 1998

[51] Int. Cl.⁷ ........................................... H05B 6/80
[52] U.S. Cl. ...................... 219/687; 219/746; 361/117; 333/1; 315/111.21
[58] Field of Search ..................... 219/679, 687, 219/688, 745, 746, 690, 693, 695, 702; 361/117, 118, 119; 333/1; 315/39, 111.01, 111.21; 372/76

[56] References Cited

U.S. PATENT DOCUMENTS

| | | |
|---|---|---|
| 3,083,528 | 4/1963 | Brown . |
| 3,148,302 | 9/1964 | Clavier et al. . |
| 3,584,260 | 6/1971 | Barbini . |
| 4,017,767 | 4/1977 | Ball . |
| 4,207,452 | 6/1980 | Arai . |
| 4,634,992 | 1/1987 | Brown . |
| 4,652,694 | 3/1987 | Goldman et al. . |
| 4,814,720 | 3/1989 | MacPhail et al. . |
| 5,107,086 | 4/1992 | Yangas . |
| 5,175,664 | 12/1992 | Diels et al. . |
| 5,206,471 | 4/1993 | Smith . |
| 5,252,178 | 10/1993 | Moslehi . |
| 5,335,238 | 8/1994 | Bahns . |
| 5,345,465 | 9/1994 | Bahns . |
| 5,471,115 | 11/1995 | Hikosaka . |
| 5,624,592 | 4/1997 | Paustian .................................. 219/679 |

OTHER PUBLICATIONS

Watkins et al., "A 60 GHz GaAs Fet Amplifier", 1983 IEEE, MTT's Digest, pp. 145–147.

*Primary Examiner*—Philip H. Leung
*Attorney, Agent, or Firm*—James Creighton Wray; Meera P. Narasimhan

[57] ABSTRACT

The present invention relates to an Atmospheric Energy Projection System for projecting electrical and thermal energy. The Microwave Facilitated Atmospheric Energy Projection System (MFAEPS) uses microwave energy at the resonant frequency or frequencies of oxygen and/or water to heat the atmosphere. This improves the potential conductivity of the air in the path of the microwave beam by heating the oxygen and water molecules in the air providing a favored pathway for breakdown. A voltage pulse generator discharges through an electrode positioned near the center of the microwave beam's recent path and creates an ionizing wave that follows the microwave beam's recent path. Alternatively, a laser can substitute for the electrode and project a high powered beam that is focused to create breakdown and thus create the ionizing pulse that travels down the favored pathway. The system can operate in an underwater environment operating at the resonant frequency of water.

24 Claims, 12 Drawing Sheets

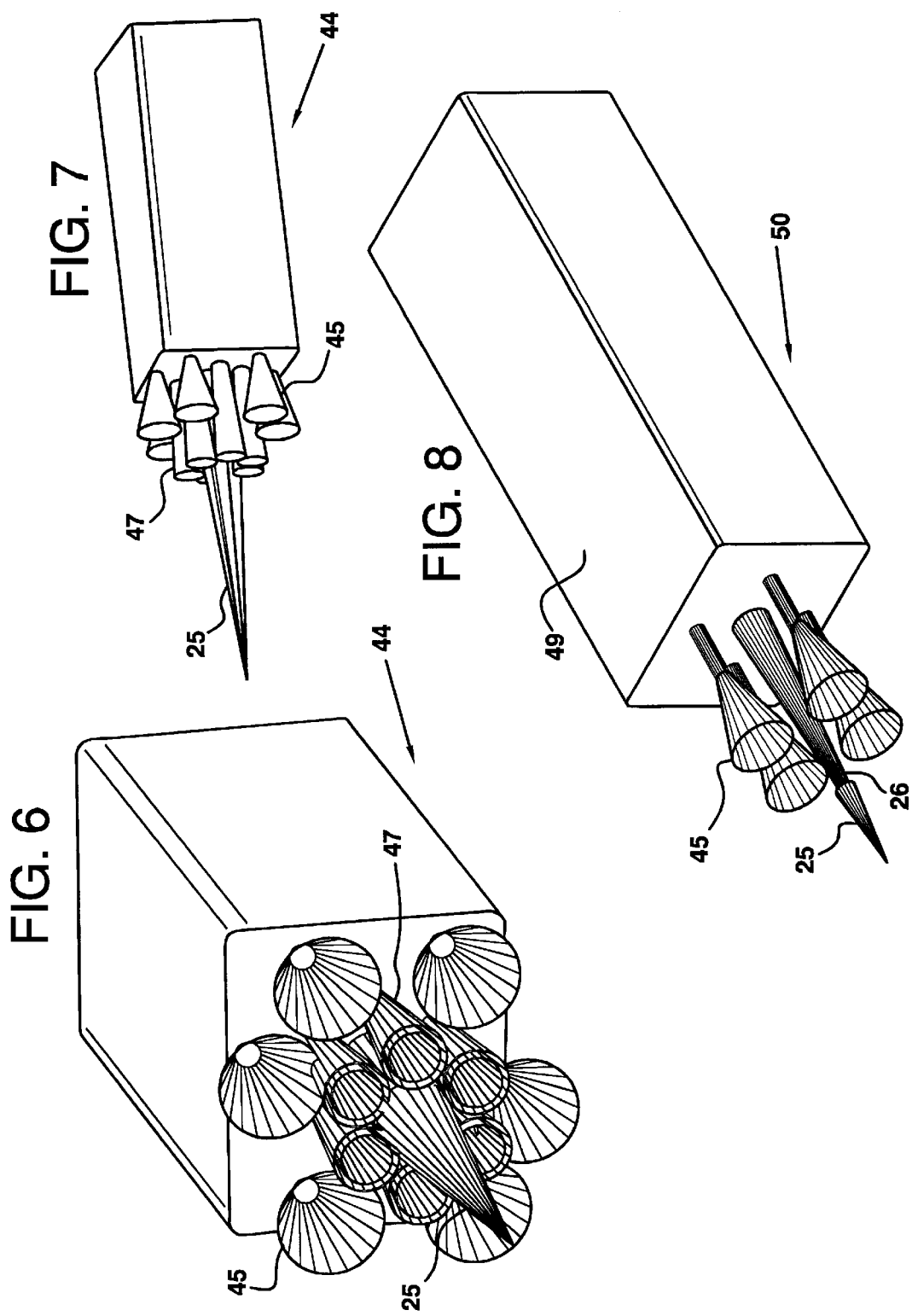

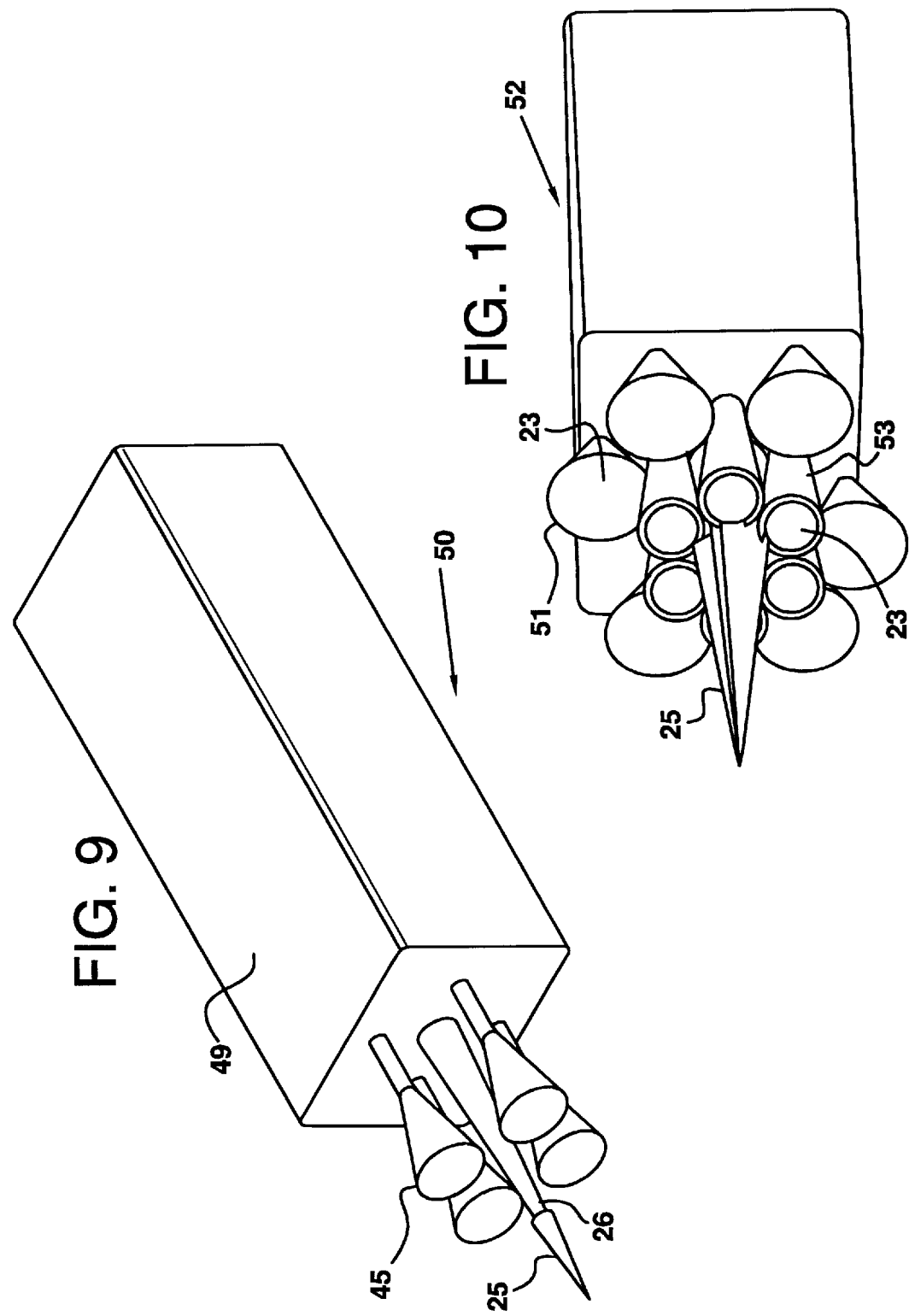

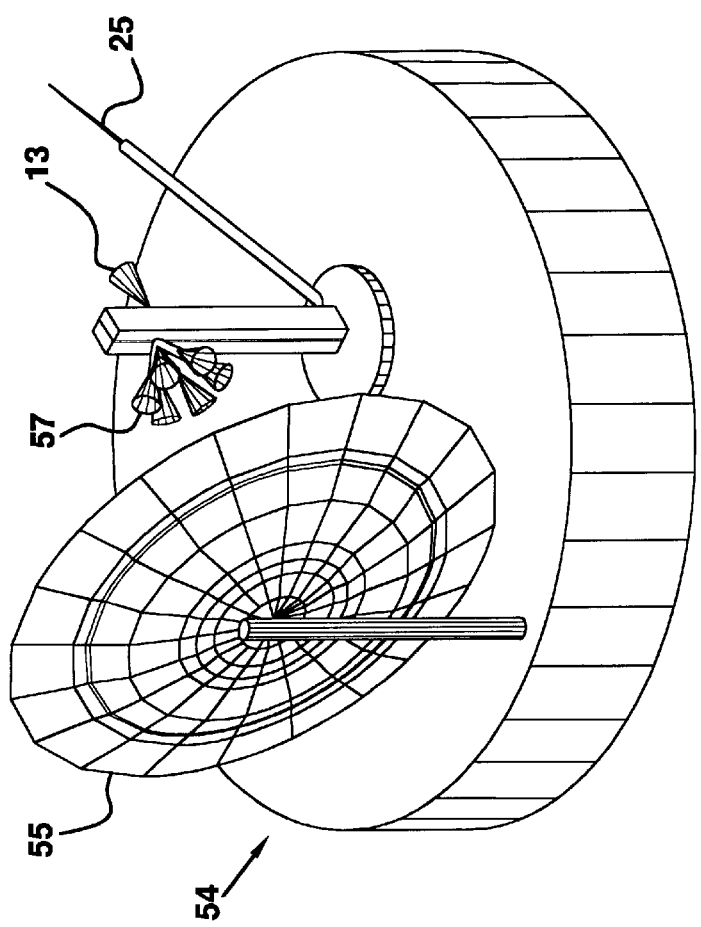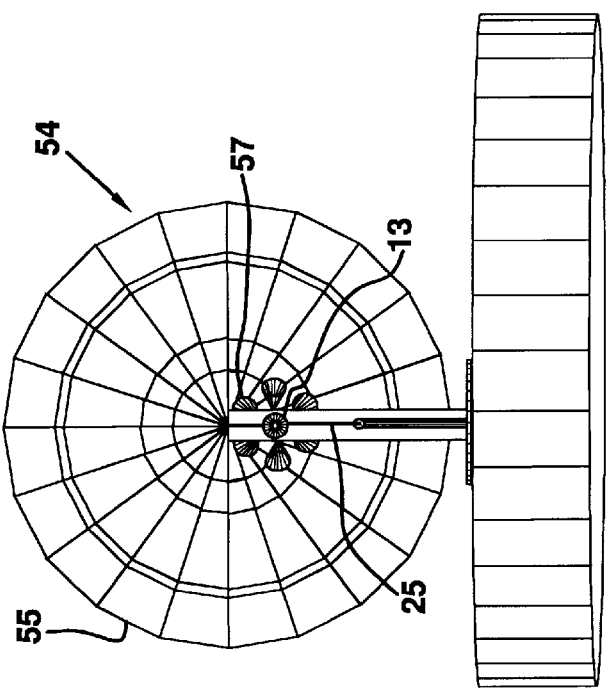

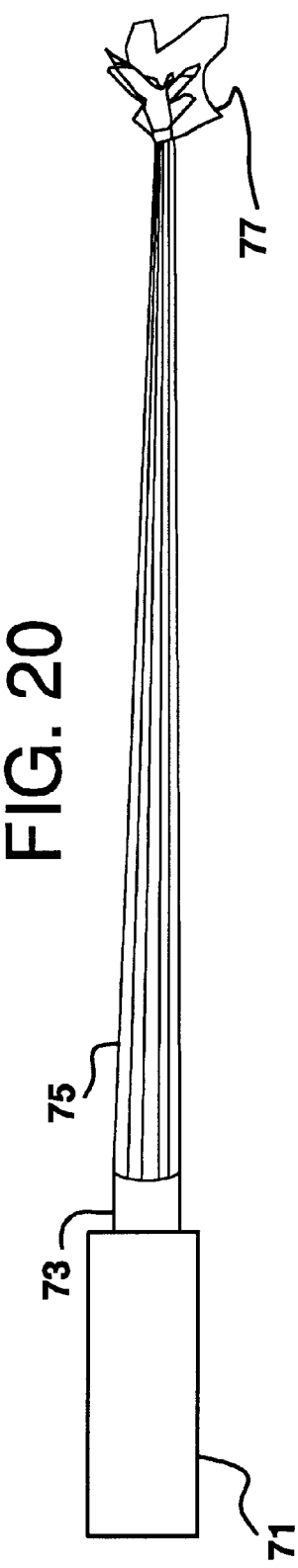
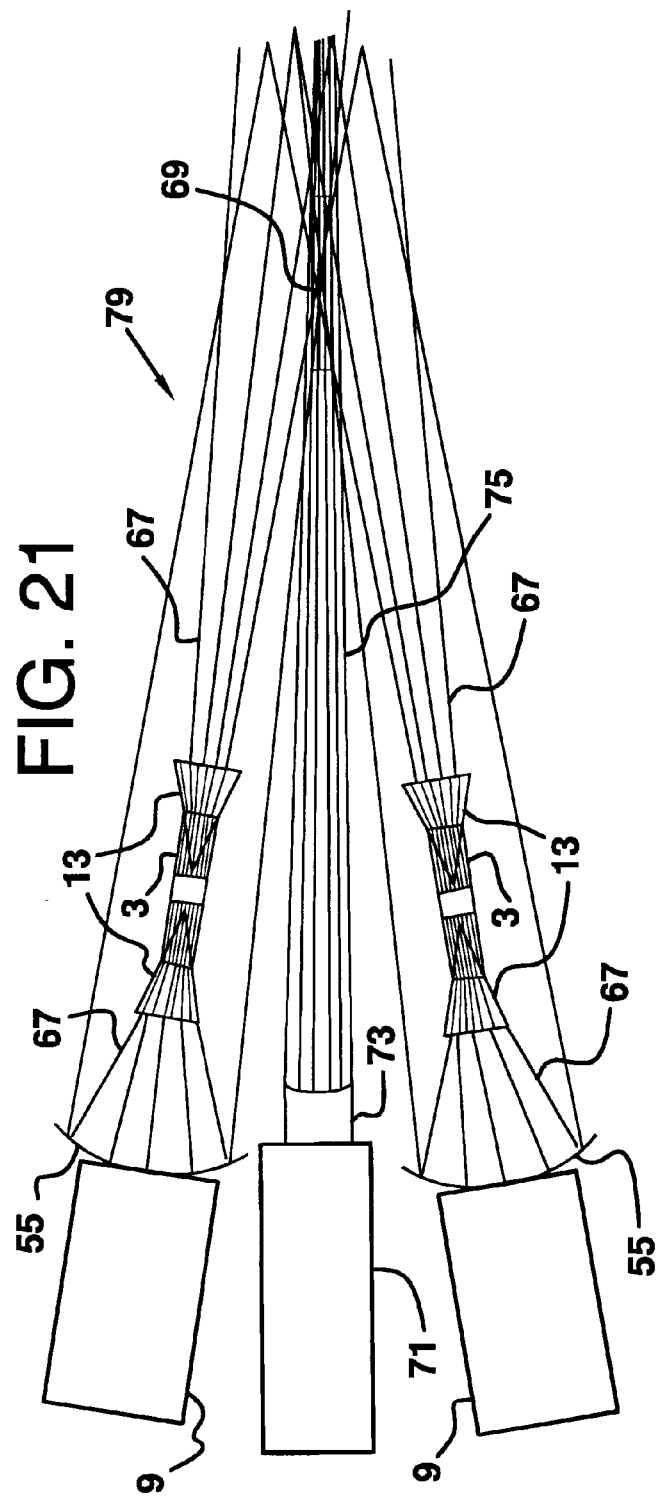

MICROWAVE FACILITATED ATMOSPHERIC ENERGY PROJECTION SYSTEM

BACKGROUND OF THE INVENTION

The present invention relates to a system for projecting thermal and electrical energy that has numerous applications. Hand-operated devices for crowd control and criminal apprehension have limited range. "Stun guns" are only effective against aggressors in close contact with a victim. Police batons and other devices used by officers require proximity to the criminal. Security fences for containing crowds and subduing rioters must be manually positioned and are not capable of mobile operation. Needs exist for law enforcement devices and systems having long range, quick action and mobile operation.

Military operations are easily frustrated by complex radar systems. Offensive efforts to destroy or inactivate enemy weapons and systems are intercepted and defeated. Needs exist for military devices and systems capable of high speed delivery that will not give a defense system time to detect and respond.

Agricultural activities, such as cattle herding, are highly inefficient. The number of cattle a single herder can handle is limited. Cattle tend to wander outside of a herder's reach and predators quickly attack herds before the herder can react. Devices that permit remote operation would increase efficiency, as more cattle could be handled by a single herder as a greater area of control and protection is established.

Needs exist for means of preventing catastrophes resulting from lightning. Facilities sensitive to lightning strikes need systems that not only detect potential storms but also channel the lightning from the atmosphere to a safe location for discharge.

Protection systems for homes and offices provide adequate detection of intruders but do not assist in trespasser apprehension. A means for temporarily disabling an intruder would increase the number of intruders apprehended and decrease the time needed to apprehend the criminal.

Needs have long existed for perfect communication channels having zero interference and invulnerability to interception.

SUMMARY OF THE INVENTION

The present invention relates to an Atmospheric Energy Projection System for projecting electrical and thermal energy. The Microwave Facilitated Atmospheric Energy Projection System (MFAEPS) uses microwave energy at the resonant frequency or frequencies of oxygen and/or water to heat the atmosphere. This improves the potential conductivity of the air in the path of the microwave beam by heating the oxygen and water molecules in the air. A voltage pulse generator discharges through an electrode positioned near the center of the microwave beam's recent path. Electrons are stripped from neighboring molecules and an ionizing wave travels outward as electrons recombine and detach from the molecules encountered following the microwave pulse's path.

All electromagnetic waves propagating in the atmosphere will create breakdown when their field strength exceeds 200,000 to 300,000 volts/meter at sea level. The field strength for breakdown diminishes with increasing altitude since atmospheric pressure lessens. When breakdown occurs a plasma is created. The electromagnetic wave that creates the plasma generally will be reflected by the plasma and will not reliably propagate through the plasma. This prevents reliably delivering the desired energy to target by electromagnetic waves that exceed breakdown field strength in the atmosphere.

Alteration of the atmospheric impedance by heating oxygen to greater than 900 Kelvin with microwave energy creates a low impedance preferred pathway for conduction for an electron plasma in the atmosphere. One antenna creates or an array of microwave antennas create a maximally heated zone at the tail of the microwave beam. If using an array, this heated zone can be designed to come together at a distance many meters from the antenna array.

The microwave pulse that heats oxygen enhances air conduction because the cluster ions such as $O_4+$ that are most efficient at squelching passage of electrons through the air are greatly reduced in number when oxygen is heated. At 900 Kelvin and above, production of $O_4+$ is virtually impossible. In short, MFAEPS first heats the Oxygen to create a favored lower resistance pathway through the air, and then introduces electric charge into the channel by discharging a voltage pulse generator with a field intensity sufficient to create a streamer or leader plasma in the heated air. That creates controlled breakdown with the flow of electrons proceeding at a speed approaching one-fifth the speed of light or slightly better down the center of the path created by the microwave pulse. This creates a narrow channel of even more enhanced conductivity because of local heating by the progress of the electron attachment, release, and re-attachment which may be used to carry additional electric charge to the target. Duration of the channel is a function of the temperature achieved and the channel diameter. A typical 1 cm radius channel may conduct for almost 50 milliseconds if the temperature reaches 4000 Kelvin. The electric charge continues down the channel until it contacts the object of interest. If no solid object encroaches in the column, the electric charge or ionizing wave diffuses harmlessly.

For maximum range, a rising voltage pulse is preferred to other wave forms but the process may proceed with square waves, other wave form voltage pulses or a train of increasingly strong voltage pulses. Oxygen has multiple resonant frequencies in the 57 to 63 Giga-Hertz-(GHz) range (it primarily has an absorption peak at 60 GHz but there are multiple spectral lines in that vicinity) and at 118 GHz. Depending on the task at hand MFAEPS will exploit either or both frequency ranges to enhance the air's conductivity for the ionizing wave to follow immediately after the microwave pulse and in the direction the pulse travels.

To improve all weather capabilities, microwave radiation around 22.22 GHz—the lowest resonant frequency of water—is used to overlap the path of the microwave pulse heating oxygen so that both oxygen and water are heated. Enhanced operation of MFAEPS's in fog, haze, rain and snow may be achieved by increased Microwave pulse power or by directing serially first 22 GHz microwave pulses in a narrow path at the target immediately (within 5 nanoseconds) prior to the 60 GHz microwave pulse(s). This latter strategy using both frequencies proves more efficient in reducing absorption of electrons by water vapor/droplets. The principal is the same, that is the 22 GHz pulse "pushes" water molecules by heating them with microwave radiation at their resonant frequency. They collide with other water molecules and heat those as well. Since the heat capacity of suspended water droplets is roughly double that of water vapor, it is estimated that application of energy in the 22 GHz pulse at 20–30% that contemplated for the 60 GHz pulse will allow for more certain delivery of the charge to the target in high humidity and foggy conditions.

Applying the same principles to undersea operation, to deliver an electrical charge rapidly down a chosen pathway requires only minimal changes. Instead of 60 GHz microwaves, one will pulse with 22 GHZ microwaves, the resonant frequency for water. The locally warmer, less dense water thus created conducts better on the basis of increased solubility of salts in the heated zone. Because of the higher attenuation for microwaves and particularly 22 GHz microwave in water, ranges will be limited compared to the atmospheric systems. Lenses and horns have to be optimized for 22 GHz rather than 60 GHz. Since this is a commonly achieved frequency, already inexpensive magnetrons are available at 22 GHz off the shelf and combinations of them allow adequate power to be achieved at minimal cost. Once the market matures and the need becomes more apparent, solid state amplifiers will ideally replace the magnetrons and other tubes. The undersea operation will tend to require longer pulses to have an impact on the sea environment when compared to the atmospheric versions or 60 GHz versions of MFAEPS.

MFAEPS may utilize 118 GHz, another resonant frequency of oxygen, to produce the same effects but with a shorter wavelength (2.54 millimeter) that is more easily collimated than 60 GHz.

For operations in the 60 GHz range any number of microwave amplifiers are suitable for signal generation although for adequate power the lower power tubes and solid state devices will have to operate as arrays of amplifiers. Signal and power generation at 60 GHz operation may be achieved using Magnetrons, Klystrons, Impact Ionization Avalanche Transit-Time (IMPATT) diodes, gallium arsenide monolithic microwave integrated circuit amplifiers, high electron mobility transistor amplifiers, Gyrotrons and variations upon them. For signal and power generation at 118 GHz Gyrotrons are available and other high power microwave devices such as the viractor and free electron laser.

For generation of electrical discharge to provide the current source to follow the microwave pulse down the favorable path it creates, modified spark plugs, Tesla coils, arc welding nozzles, and banks of capacitors including Marx generators (also called Marx banks) are available.

A Laser Augmented MFAEPS substitutes a high powered laser for the central electrode or electrodes as a source for the field to generate the ionizing wave that propagates down the favored pathway created by the microwave energy. A laser pulse released 10 nanosecond after the microwave pulse ends but following the pulse tail will propagate in the direction of the coalescing microwaves that are heating the oxygen molecules. When the laser pulse is strong enough to create breakdown the plasma created propagates down the heated channel created by the overlapping microwave beams rather than just diffusing in a random or multiple random directions.

Combining any sufficiently high power laser as a substitute for the MFAEPS electrode such that the plasma is created as the beam focuses at 100 meters from the Laser Augmented MFAEPS apparatus also simplifies the design in that compensatory return currents have no favored pathway back to the apparatus. The favored pathway is created by microwave beams at a resonant frequency of oxygen that come together to create a central beam whose hottest initial point occurs many meters in front of the Laser Augmented MFAEPS apparatus.

MFAEPS has numerous potential applications in a variety of fields, including its integration into devices used in military operations. At high power, MFAEPS delivers hundreds of amps of current to land, water, or airborne targets, thereby confusing and immobilizing advanced technology. The electric charge delivered using MFAEPS's travels at one-fifth the speed of light, making evasion difficult. Ground forces may use MFAEPS for destroying or inactivating controlled directed electronic counter measures (ECM).

In September 1997, the Air Force discussed plans for a laser mounted on a 747 to burn a hole in a recently launched ICBM or shorter range ballistic missile while it was in its boost stage and still in the atmosphere. The plan would fail in principle because any laser that has the power to melt metal at a distance will have a field strength that will create breakdown such that the pulse does not propagate through the air and reach its target with the intended energy. Coupling the plasma to the MFAEPS heated channel directs the energy to the target. Although exploding missiles with the laser's heat falls by the wayside with this realistic view of the physics, missile electronics are subject to damage and ground based electronics may be very precisely targeted with such a system.

At low powers, the present invention can be used to perform agricultural activities, such as herding livestock. MFAEPS'S, having a longer range than a cattle prod, allow one ranch hand to more efficiently control a herd. Devices can also be developed to defend grazing cattle and sheep against predators. Properly tuned, an MFAEPS mechanism merely stings or stuns the predator and thus avoids killing an endangered species or domestic animal.

An array of MFAEPS sources can be used to fence off areas from human or animal passage. The fence is visible as streaks of lightning passing between the two MFAEPS sources. The amount of charge carried by the fence is adjustable so as to merely stun or mildly shock an imprudent observer who chooses to proceed through the fence. The requisite charge is realized by applying enough voltage to achieve breakdown in the air in the channels that reform rapidly. Multiple channels a few centimeters apart created by an array of 60 GHz microwave sources and charge sources aligned in a column and radiating in the same plane creates such a barrier. Similarly, high security-areas can be equipped with MFAEPS's in doorways and hallways to instantly create a barrier to human, animal or automated system passage. The current is adjustable upwards from mild pain to a power sufficient to stun a man or animal, leaving the interloper temporarily unconscious or disabled. MFAEPS's can also be incorporated into home security systems to augment home defenses against unwanted intruders.

In the field of law enforcement, the present invention can be used by police officers to stun and subdue rioters and criminals without inflicting lasting injury. MFAEPS is far more directional, easier to control, less toxic and environmentally safer than tear gas, the weapon commonly employed in those situations. Mounting a column of MFAEPS's on trucks creates a mobile curtain of charge between the trucks themselves and buildings along the street, compelling rioters to move along or be shocked.

Focusing MFAEPS on thunder clouds creates a predictable discharge pathway for lightning. Lightning is directed down the channel to a safe ground or to appropriate storage devices, such as banks of capacitors, batteries, or water directly heated to steam to move a turbine to regenerate electricity in a controlled fashion. Airports, chemical plants, NASA launch facilities and other structures at risk from catastrophic damage from lightning strikes can use MFAEPS's to predictably discharge storms.

For secured communications, a communication corridor can be established by a ring of parallel MFAEPS channels creating a continuous zone of breakdown that surrounds an unexcited normal air core. In the calm unexcited air corridor a communication carrier such as a radio wave, microwave, laser or emitter pulse is established. Perfect communication having zero interference and freedom from interception results from absorption and reflection of the signal by the air breakdown occurring parallel to the signal path. Thus observers outside the core may observe the breakdown path but the sigencapsulin the calm core is encapsulated and hidden from them. Further, efforts to read the beam by interposing another beam and interpreting interference patterns is also futile due to absorption and reflection similar to what occurs when microwaves routinely reflect off the ionosphere. Additional signal security is obtained at the receiving end as the air core is oscillated slightly with coded instructions for matching oscillations by the reception unit.

The present invention is a multiple antenna element with a single or multiple electrode version of MFAEPS. For this architecture multiple uniform antenna elements (slotted waveguide antennas, microstrip antennas, fiber optics appropriately doped to conduct 60 GHz, horn antennas, lenses or leaky waveguide antennas) are used in phased arrays to concentrate projected microwave energy centrally or using phase shifters to electronically direct the main beam off axis toward one or another targets. For arrays producing a centrally directed beam a central electrode is used to release charge to the excited zone of air created by the main beam and, as in single antenna MFAEPS, the charge follows the path of the main beam. For the phased array that is scanning electronically, electrodes are located around the periphery of the array face and projecting outward beyond it. The electrode is selected based on which electrode couples most effectively to the beam that is directed at a given target. Alternatively, the central electrode may be gimbaled to shift or tilt to follow the direction to which the central lobe is steered.

In a second form of Multiple Antenna Element Microwave Facilitated Atmospheric Energy Projection System multiple beams overlap in space but not simultaneously, i.e. not as a phased array. Instead a ring of horn antennas for example will surround a central electrode and will all be focused for the same target such that their diverging beams overlap soon after leaving the horn aperture. These horns will fire serially around the ring or fire in a crisscrossing order but with enough nanoseconds between pulses per horn that no destructive interference occurs and the zone immediately beyond the electrode's tip continues to be excited until energy levels reach near breakdown levels at which point the voltage pulse generator discharges into the excited air and the ionizing wave of free electrons travels down the path of least resistance the path of air heated by the overlapping beams.

MFAEPS in all embodiments achieves energy projection via several mechanisms. Heating oxygen such that the formation of cluster ions, such as $O_4+$ that inhibit the passage of electrons, is prevented is the dominant effect. Oxygen molecules excited by the microwaves also have a greater statistical likelihood to give up an electron than to absorb one since entropy favors the ionization process that gives up electrons to plasma formation and thus favors the ensuing avalanche of electrons known as breakdown. The number of oxygen and nitrogen molecules in the path of the beam has been reduced relative to the surrounding cooler air outside the beam because the hot molecules (the oxygen absorbing microwaves and the nitrogen molecules that collide with the excited oxygen) move outward from the beam faster than the molecules at lower velocity (those at ambient temperature) outside the beam diffuse inward. The voltage pulse generator discharge is released about 1 to 10 nanoseconds after the end of a microwave pulse to introduce the electrical charge while the energy from the pulse is still influencing molecules that were in the pulse path and are near the electrode tip.

The MFAEPS in all embodiments differs from laser systems that seek to create a conducting channel by ionizing the atmospheric molecules in the path of the laser beam. MFAEPS seeks to condition the air to conduct such that when ionization does occur the process goes on longer. This results because species of cluster ions that normally absorb and neutralize electrons are not readily formed, hence, any given plasma created by the electrical discharge will propagate farther. Molecules in the electron charge cloud's path will be more prone to exchange electrons rather than to absorb them.

The electrode or current emitting source for MFAEPS in single antenna or multiple antenna element embodiments extends outward from the plane of the antennae ends to reduce the likelihood of the charge jumping the gap and traveling back to the source of the microwave beam after release rather than onward to the target.

These and further and other objects and features of the invention are apparent in the disclosure, which includes the above and ongoing written specifications, with the claims and the drawings.

BRIEF DESCRIPTION OF THE DRAWINGS

FIG. 6 represents a schematic view of a dual frequency enhanced MFAEPS.

FIG. 7 is a lateral view of the dual frequency enhanced MFAEPS.

FIG. 8 presents a schematic perspective view of the external elements of the undersea application for MFAEPS.

FIG. 9 is a solid-body perspective view of the undersea application for MFAEPS.

FIG. 10 is a solid-body perspective view of an MFAEPS with multiple antennas showing two aperture sizes for smoother beam generation with a more uniform field strength.

FIG. 11 presents a schematic lateral view of an MFAEPS with augmented antennas including backward facing antennas and a parabolic reflector.

FIG. 12 is a schematic perspective view of an MFAEPS with augmented antennas including backward facing antennas and a parabolic reflector.

FIG. 20 depicts a schematic representation of a laser system.

FIG. 21 shows a schematic representation of a Laser Augmented MFAEPS.

DETAILED DESCRIPTION OF THE DRAWINGS

Figure 1:
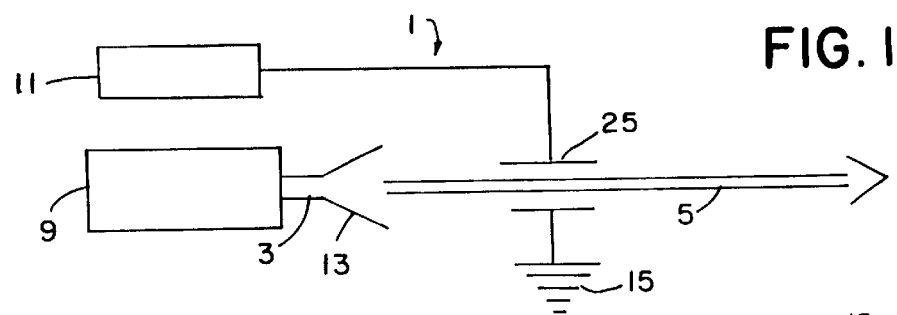
FIG. 1 is a process diagram for the Microwave Atmospheric Energy Projection System.

Referring to the drawings and to FIG. 1, the Microwave Facilitated Atmospheric Energy Projection System (MFAEPS) 1, using microwave radiation by way of a waveguide 3, takes advantage of absorption of the radiation by oxygen or water at their respective resonant frequencies to create a narrow channel 5 of excited molecules heated to around or above 900 Kelvin. A transmitter 9 generates the microwave radiation and transmits the radiation along a cable 17 to waveguide 3 which in turn guides the radiation to antenna 13.

An electric current is then placed into the channel 5 by electrode 25, and an electric charge is transmitted a predetermined distance along the channel 5. The electric current is generated by an electric charge source 11 and is conducted to electrode 25 by a cable 19. The electrode 25 has a ground 15.

Alteration of the atmospheric impedance by heating oxygen or water to greater then 900 Kelvin with microwave energy creates a low impedance preferred pathway or channel 5 for conduction for an electron plasma in the atmosphere. An array of antennas 13 transmits microwaves to create a moving maximally heated zone at the tail of overlapping microwave beams. The origin of this heated zone may be designed to come together at a distance many meters from the antenna array.

For example, upon increasing the energy in the oxygen molecules in the channel 5 of air by transmitting 60 GHz microwaves into the channel 5, electron mobility in the oxygen within the beam increases and cluster ion formation is greatly inhibited, thereby favoring the flow of current down the channel 5 rather than through the cooler surrounding air. The microwave pulse that heats oxygen enhances air conduction because the cluster ions such as $O_4+$, that are most efficient at squelching passage of electrons through the air, are greatly reduced in number. At 900 Kelvin and above, production of $O_4+$ is virtually impossible.

MFAEPS 1 first heats oxygen to create a favored lower resistance pathway through the air, and then introduces an electric charge into the channel by discharging a voltage pulse generator with a field intensity sufficient to create a streamer or leader plasma in the heated air. That creates controlled breakdown with the flow of electrons proceeding at a speed approaching one-fifth the speed of light or slightly better down the center of the path created by the microwave pulse. This creates a narrow channel of even more enhanced conductivity because of local heating by the progress of the electron attachment, release, and re-attachment which may be used to carry additional electric charge to the target.

Duration of the channel is a function of the temperature achieved and the channel diameter. A typical 1 cm radius channel may conduct for almost 50 milliseconds if the temperature reaches 4000 Kelvin. The electric charge continues down the channel until it contacts the object of interest. If no solid object encroaches in the column, the electric charge or ionizing wave diffuses harmlessly.

MFAEPS 1 uses 60 GHz or 118 GHz microwave pulses to excite oxygen molecules to almost the air breakdown energy level. MFAEPS 2 may also use 22 GHz microwave pulses to excite water molecules to almost the breakdown energy level. The electric charge is then released into the channel. This creates controlled breakdown with the flow of electrons proceeding down the channel 5 at a speed approaching one-fifth the speed of light or slightly faster. MFAEPS 1 either releases a charge into the channel 5 as a single pulse or multiple discharges sequentially with each stronger than the last and meeting less resistance than the one before it.

The microwave radiation may be generated by any of a number of transmitters 9 depending on operational requirements. Multiple gallium arsenide monolithic microwave integrated circuit 60 GHz amplifiers or high electron mobility transistor amplifiers may be coupled to generate the microwave pulses for channel creation for many moderate power applications. For higher power channels one or a small group of 60 GHz Gyrotron tubes such as a gyromonitron oscillator, a gyrotron based traveling wave tube amplifier (GyroTWT), or a gyroklystron amplifier may be used to put out 100 to 120 joules per pulse or better. A large array of 60 GHz Klystron amplifiers or 60 GHz Magnetron amplifiers operating at near the maximum power output may also be combined to supply higher power microwave pulses for longer ranges.

The selection of source 11 of electric discharge for keeping the channel 5 open and for providing a current source is dependent on the predetermined distance of current travel and projected energy delivery. MFAEPS may use modified spark plugs, tesla coils, arc welding nozzles, banks of charged capacitors, Marx generators, Fitch generators or other voltage pulse sources 11 to deliver a charge to the channel 5. In one embodiment, a Marx bank is used to release large charges rapidly and predictably. A Marx bank is a bank of capacitors that are charged in parallel and discharged serially.

Power requirements for generating 60 GHz microwaves depend on the desired range, the channel 5 diameter, and the channel 5 temperature prior to the pulse. MFAEPS 1 does not require that all energy put into the channel 5 completely constitute microwaves. Furthermore the plasma model suggests that conduction will be greatly enhanced using just enough microwave energy at a resonant frequency of oxygen to heat the oxygen molecules from room temperature to 900 K, an increase of roughly 600 degrees Kelvin, will suffice since that will inhibit cluster ion formation adequately which in turn enhances conduction greatly.

Once some gradient is established, electrical discharges along the channel 5 course through the atmosphere through the favored pathway. The discharges, by rapidly flowing in the channel 5, heat the channel 5 and reduce resistance. MFAEPS 1 is more efficient than natural lightning, because the invention creates the channel 5 of excited molecules directly by exciting oxygen at its resonant frequency. That provides a straight path offering a low resistance to current and avoiding the changes in direction normally observed with lightning.

The anticipated range for MFAEPS operating on the ground is from a few meters to 41 kilometers. With sufficient energy from an airborne source, that range may be increased further. The actual range of the invention is dependent on the power delivered to create the channel, the electrical discharge available to keep the channel 5 open and traveling along the channel, and the channel 5 radius required for carrying the desired current. Lightning data demonstrates that a 1 cm radius channel 5 easily carries a current of 100 Amps.

Enhanced operation of MFAEPS 1 in fog, haze, rain and snow may be achieved by increased Microwave pulse power or by directing serially first 22 GHz microwave pulses in a narrow path at the target immediately (within 5 nanoseconds) prior to the 60 GHz microwave pulses. Microwave radiation around 22 GHz, the lowest resonant frequency of water, is used to overlap the column 5 of the microwave pulse heating oxygen so that both oxygen and water are heated. Using both frequencies is more efficient in reducing absorption of electrons by water vapor/droplets.

The principal is the same, that is the 22 GHz pulse heats water molecules with microwave radiation at their resonant frequency. The heated molecules collide with other water molecules and heat those as well. Application of energy in the 22 GHz pulse at 20–30% that contemplated for the 60 GHz pulse will allow for more certain delivery of the charge to the target in high humidity and foggy conditions.

In undersea operation, to deliver an electrical charge rapidly down a chosen column 5 requires only minimal changes. Instead of 60 GHz microwaves, the system 1 will pulse with 22 GHz microwaves. The locally warmer, less dense water thus created conducts better because of the increased solubility of salts in the heated zone. Because of the higher attenuation for microwaves particularly 22 GHz microwave in water, ranges will be limited compared to the atmospheric systems. Lenses and antennas 13 have to be optimized for 22 GHz rather than 60 GHz. Since this is a commonly achieved frequency already inexpensive magnetrons are available at 22 GHz off the shelf and combinations of them allow adequate power to be achieved at minimal cost. Once the market matures and the need becomes more apparent, solid state amplifiers will ideally replace the magnetrons and other tubes. The undersea operation will tend to require longer pulses to have an impact on the sea environment when compared to the atmospheric versions or 60 GHz versions of MFAEPS.

Figure 2:
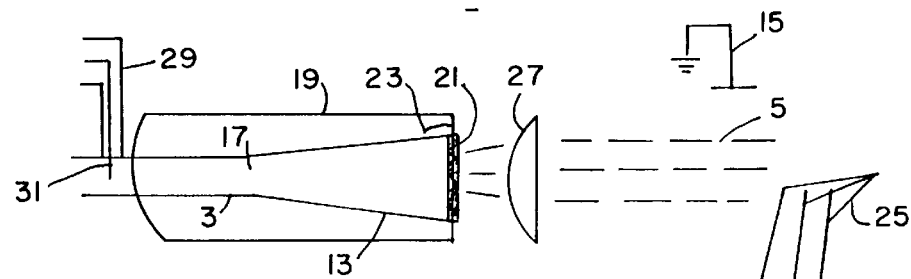
FIG. 2 is a more detailed diagram of the system showing a waveguide, a horn antenna, a microwave lens and an electrode.

FIG. 2 shows a preferred embodiment of the present invention having a waveguide 3 and a conical horn antenna 13 connected to the waveguide 3 at the conical horn apex 17. To increase the energy applied per pulse without breakdown occurring in the waveguide 3, the waveguide 3 and the antenna 13 assembly are filled with an inert gas such as $N_2$ or $SF_6$, at pressures greater than atmospheric pressure. The waveguide 3 is pressurized to allow higher power pulses for more rapid channel 5 construction and longer range. When a conical horn antenna 13 having an aperture of 4.048 cm is used, 120 joules may be expended over 6.32 microseconds, which is equivalent to 19 MW. Sealing the system 1 and pressurizing the waveguide 3 with inert gases increases pulse power handling capability but higher power will increase heat production resulting in a need for external cooling. In one embodiment a cooling jacket 19 for water cooling is fitted around the waveguide and conical horn antenna 13, as shown in FIG. 2. The embodiment of the system 1 shown in FIG. 2 has a transparent window 21 positioned on the outer edge or aperture 23 of the conical horn antenna 13. A microwave lens 27 positioned between an electrode 25 and the conical horn antenna 13 reduces divergence of the channel 5. A set of coaxial cables 29 extends from a transmitter 9 to an antenna probe 31 in the waveguide 3. A set of coaxial cables 33 extends from the electrical charge source 11 to an electrode 25 positioned in the channel 5. The lens 27 can be moved forward or backward or taken out of the path to alter the beam pattern depending on the desired range to target.

Figure 3:
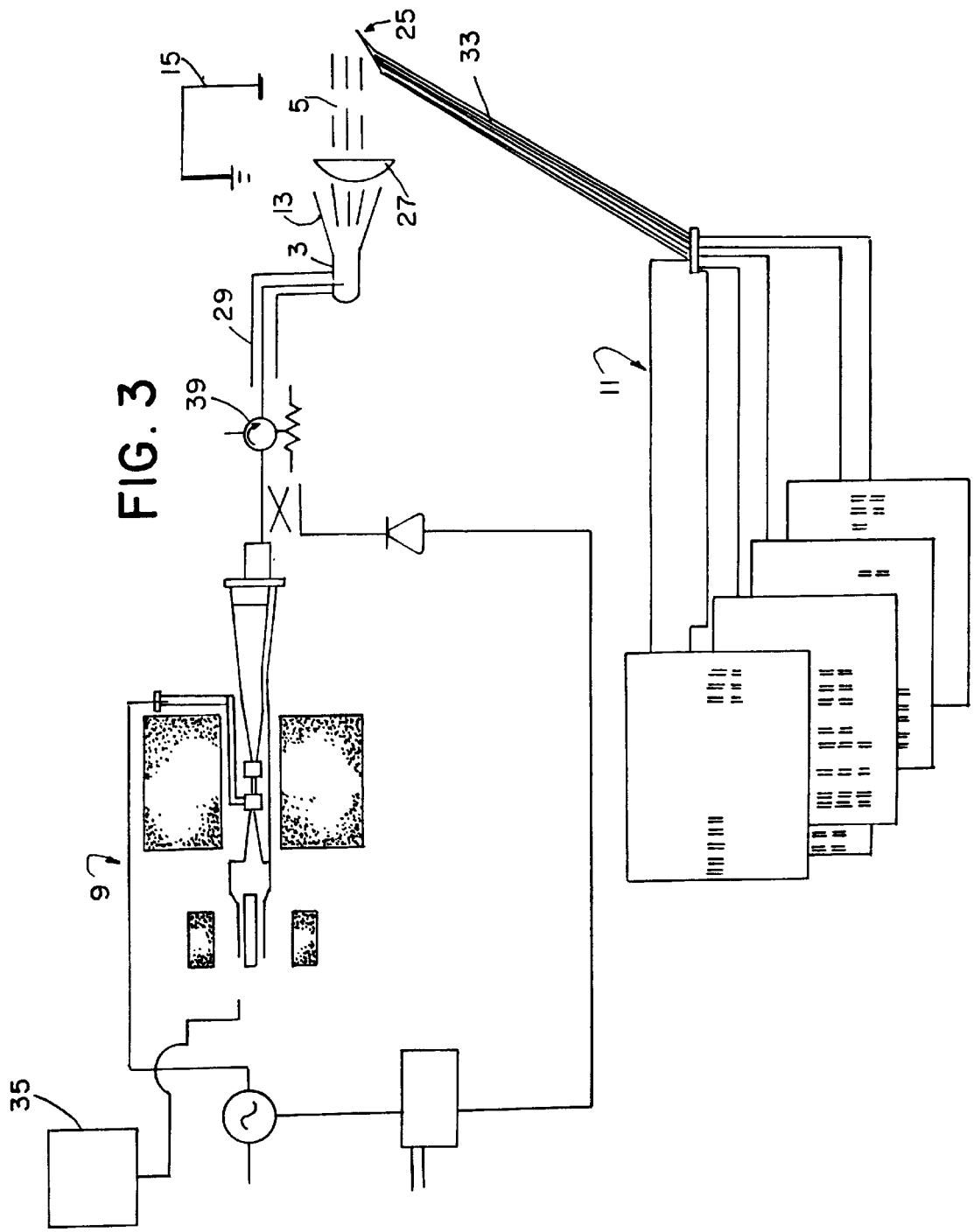
FIG. 3 is a preferred embodiment of the system having a gyroklystron amplifier for generating the microwave pulses for channel creation.

FIG. 3 shows MFAEPS 1 having a Gyrotron as the transmitter 9. In that embodiment, the Gryotron is a Gyroklystron, while other Gyrotrons, like GyroTWT and Gyromonitron, may be substituted. The Gyrotron, which is connected to a power supply 35, generates and transmits microwave pulses to a waveguide 3 through a set of cables 29. The pulses propagate through a microwave lens 27 which reduces divergence, resulting in a narrow microwave beam channel 5. A release electrode 25 that is connected to a charge source 11 is positioned on the beam channel 5. The embodiment of the invention 1 shown in FIG. 3 has a Marx bank of capacitors as the charge source 11. Once sufficient energy has been applied to create the channel 5 with the desired distance, a charge is released into the channel 5 by the Marx Banks. A ground plate 15 is located close to the channel 5 to provide a path for a released charge if the channel 5 is not present when the charge is released. In that situation, the charge jumps from the releasing electrode 25 to the ground plate 15 and spares challenge to the circulator 39 in the transmitter 9.

Figure 4:
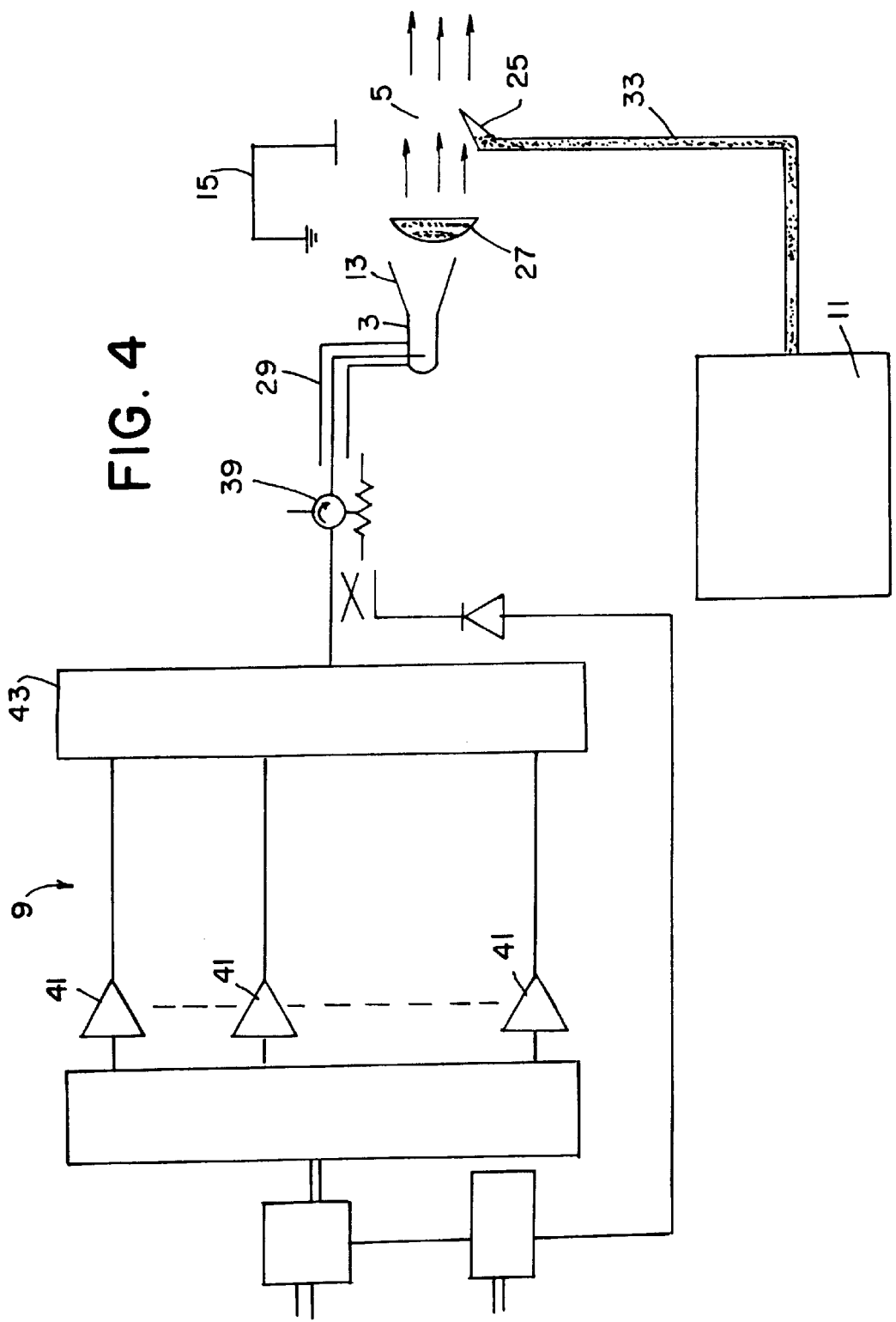
FIG. 4 is a preferred embodiment of the system having multiple 60 GHz solid-state amplifiers for generating the microwave pulses for channel creation.

The transmitter 9 may be solid state microwave amplifiers, as shown in FIG. 4, rather than tube based sources. Multiple solid state microwave amplifiers 41, like gallium arsenide microwave monolithic integrated circuit amplifiers and high electron mobility transistor amplifiers, may be combined to achieve necessary power output. The output from each amplifier 41 is merged in a combiner 43 and is delivered to the waveguide 3.

Figure 5:
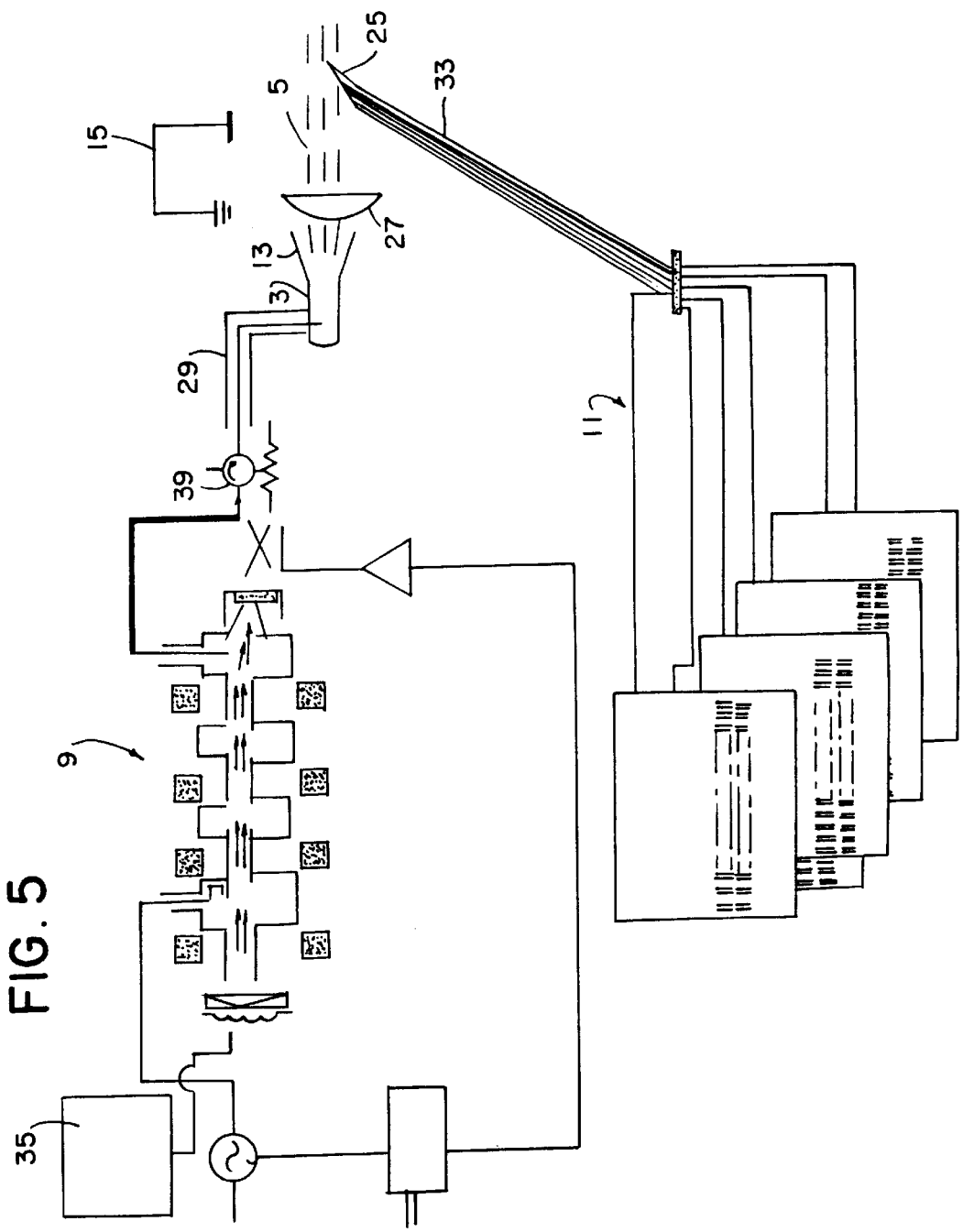
FIG. 5 is a preferred embodiment of the system having a multi-cavity 60 GHz Klystron amplifier for generating the microwave pulses for channel creation.

FIG. 5 shows another preferred embodiment of the system 1 having a 60 GHz Klystron as the transmitter 9.

FIGS. 6 and 7 represent a dual frequency enhanced MFAEPS 44 operating at both 22 GHz and 60 GHz with an outer array of horn antennas 45 for 22 GHz operation, an inner array of horn antennas 47 for 60 GHz operation and a central electrode 25. Lenses 27 may be fitted to the antennas 45, 47 to allow for higher pressure operation and thus higher pulse power delivery. Similarly, lenses 27 may help focus the microwave beams centrally so that a zone of excited or heated air is created that travels forth offering a low impedance pathway for the electrical charge to follow. Just as for the singular frequency 60 GHz models, the transmitters 9 for both 60 GHz and 22 GHz and the independent power supplies 35 for the transmitters 9 capable of rapid energy release are required for operation of the dual frequency MFAEPS 44.

FIGS. 8 and 9 present perspective views of the elements of the undersea application for a MFAEPS 50. The schematic view of FIG. 8 shows a water-proof housing 49 and 22 GHz horn antennas 45 projecting forward in an array surrounding the electrode 25. The electrode 25 is insulated 26 from the base to the distal end at the tip of the electrode 25. FIG. 9 is a solid body perspective view of the undersea application for MFAEPS 50. This view also shows the water-proof housing 49, the 22 GHz horn antennas 45, and the electrode 25.

FIG. 10 shows an MFAEPS with augmented antennas 52 which has multiple antennas around a central electrode 25. The outer ring of antennas 51 have a larger aperture 23 to produce narrower half-power band-widths than the inner ring of antennas 53. The narrower half-power band-widths contribute energy to heating the path for the electric charge centrally at a greater distance out than the inner array of antennas 53.

Figure 13:
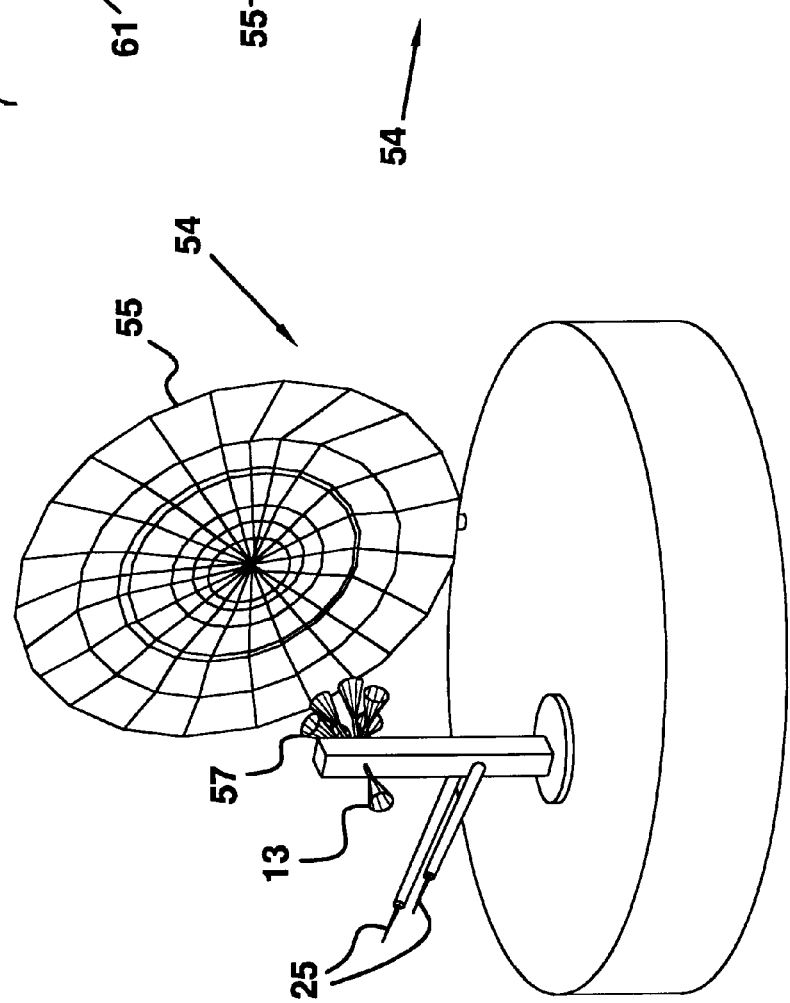
FIG. 13 is a solid-body perspective view of an MFAEPS with a parabolic reflector and two central electrodes.

FIG. 11 shows an MFAEPS with augmented antennas 54 which has multiple antennas 57 radiating backwards at a parabolic reflector 55 to provide a beam that concentrates at a distance while a central antenna 13 radiating forward supplies energy for the favored pathway or column 5. A central electrode 25 releases a charge into the periphery of the column 5 from the central antenna 13. FIG. 12 shows another view of the same embodiment which more clearly shows the multiple antennas 57, the parabolic reflector 55, the central antenna 13, and the central electrode 25. FIG. 13 shows a view of a similar embodiment which has two electrodes 25.

Figure 14:
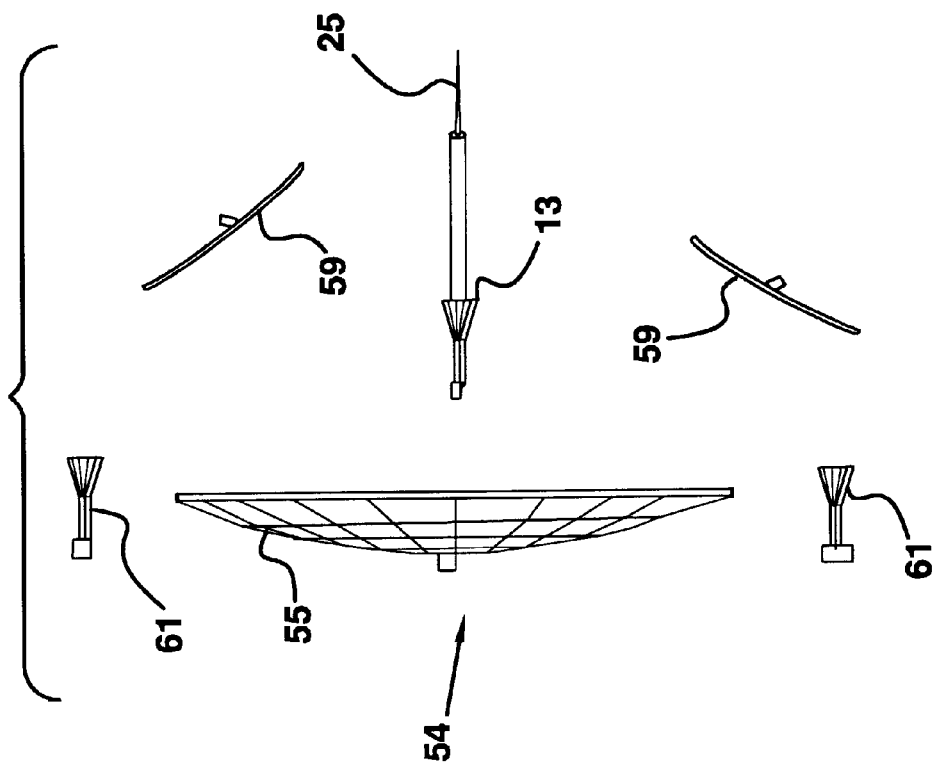
FIG. 14 is a top view of an MFAEPS with augmented antennas including side antennas, side reflectors, and a parabolic reflector.
Figure 15:
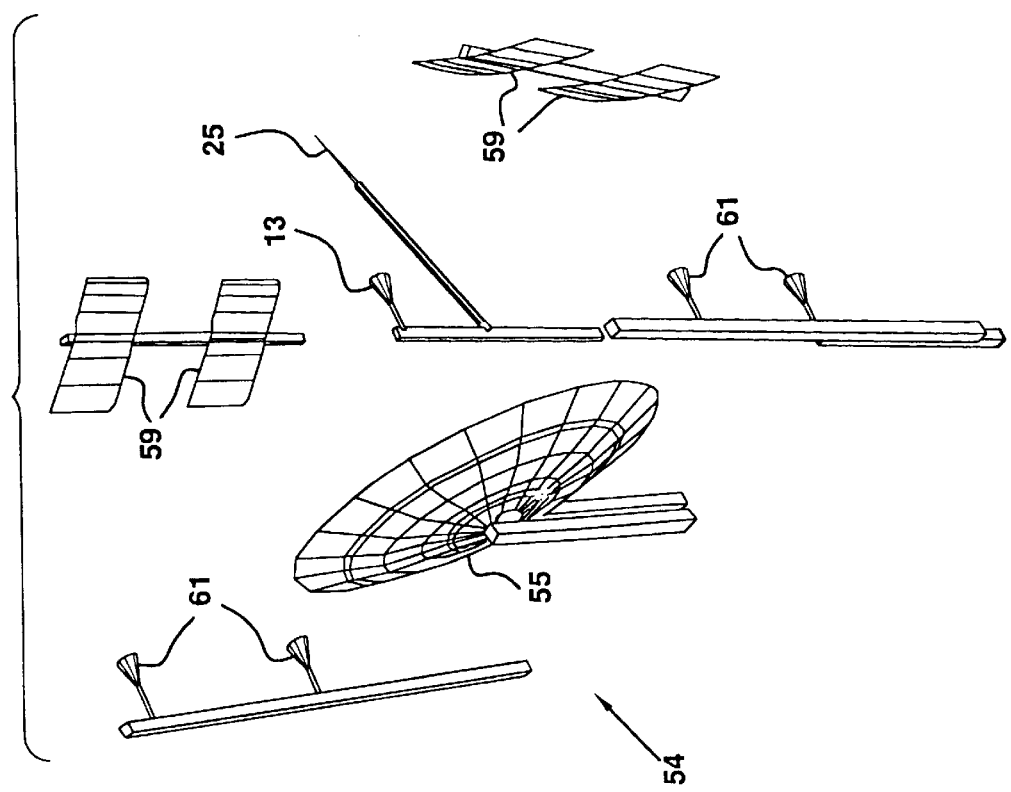
FIG. 15 is a perspective view of an MFAEPS with augmented antennas including side antennas, side reflectors, and a parabolic reflector.

FIG. 14 shows an MFAEPS with augmented antennas 54 which has multiple side antennas 61 firing forward at side reflectors 59 that direct their energy onto the parabolic reflector 55 to concentrate microwave energy at a distance down the column 5. The concentrated microwave energy helps compensate for the loss of energy from the central antenna 13 as the beam diverges. The central electrode 25 is located in the same vertical plane as the central antenna 13. FIG. 15 shows another view of the same embodiment, which better depicts the spatial relationship between the side antennas 61, the side reflectors 59, the parabolic reflector 55, the central antenna 13 and the central electrode 25.

Figure 16:
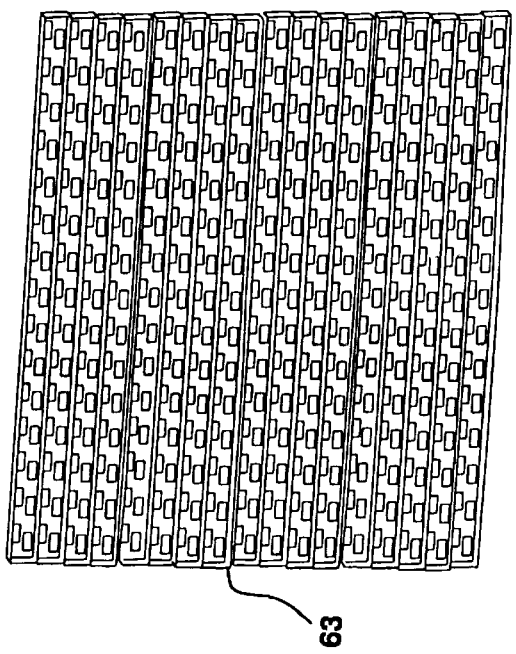
FIG. 16 is a section of a slotted waveguide antenna panel.

FIG. 16 shows a segment of a slotted waveguide phased array antenna panel 63. For greater distance energy projection, in addition to the initial central microwave antenna 13, slotted waveguide phased arrays 63 may be assembled parallel to the central antenna 13. The beams generated by the slotted waveguide phased array 63 augment heating of the column 5 as they coalesce with the diverging central beam. The slotted waveguide phased array antennae 63 create beams that focus inward to augment energy supply to create a longer range column 5.

Figure 18:
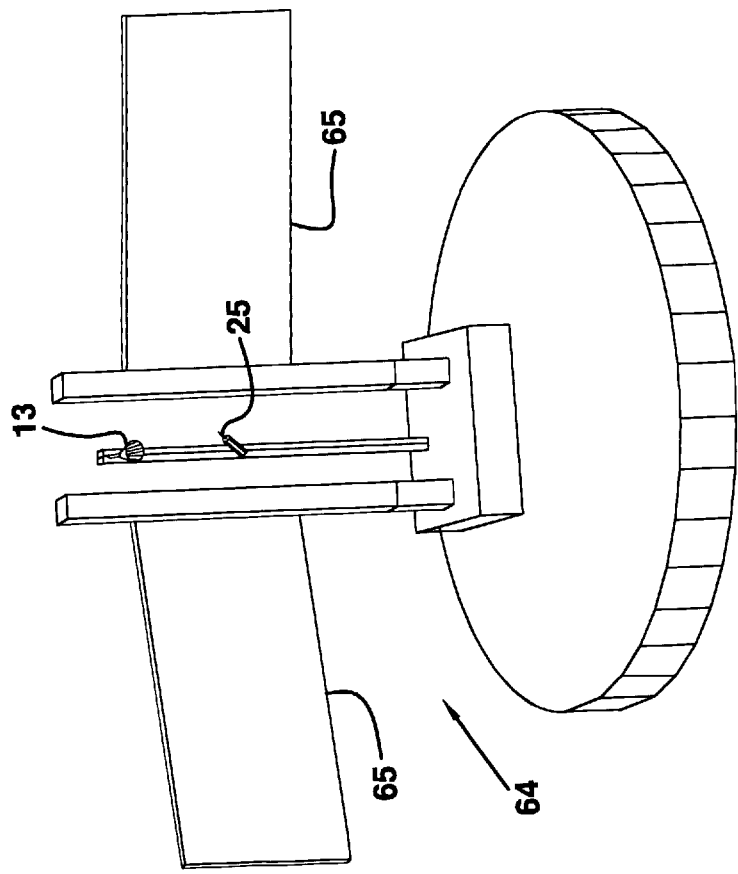
FIG. 18 is a perspective view of an MFAEPS with augmented antennas including slotted waveguide antenna panels.
Figure 17:
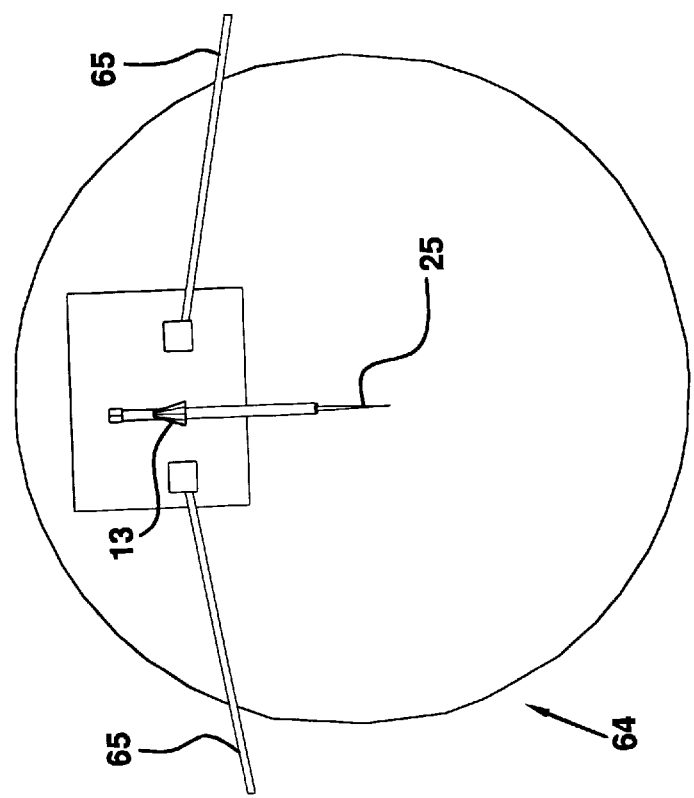
FIG. 17 is a top view of an MFAEPS with augmented antennas including slotted waveguide antenna panels.

FIG. 17 shows a top view of an MFAEPS with augmented antennas 64 which has dual slotted waveguide phased array antenna panels 65 integrated with a central antenna 13 and a central electrode 25. FIG. 18 shows a perspective view of the same embodiment depicting the dual slotted waveguide phased array antenna panels 65, the central antenna 13 and a central electrode 25.

Figure 19:
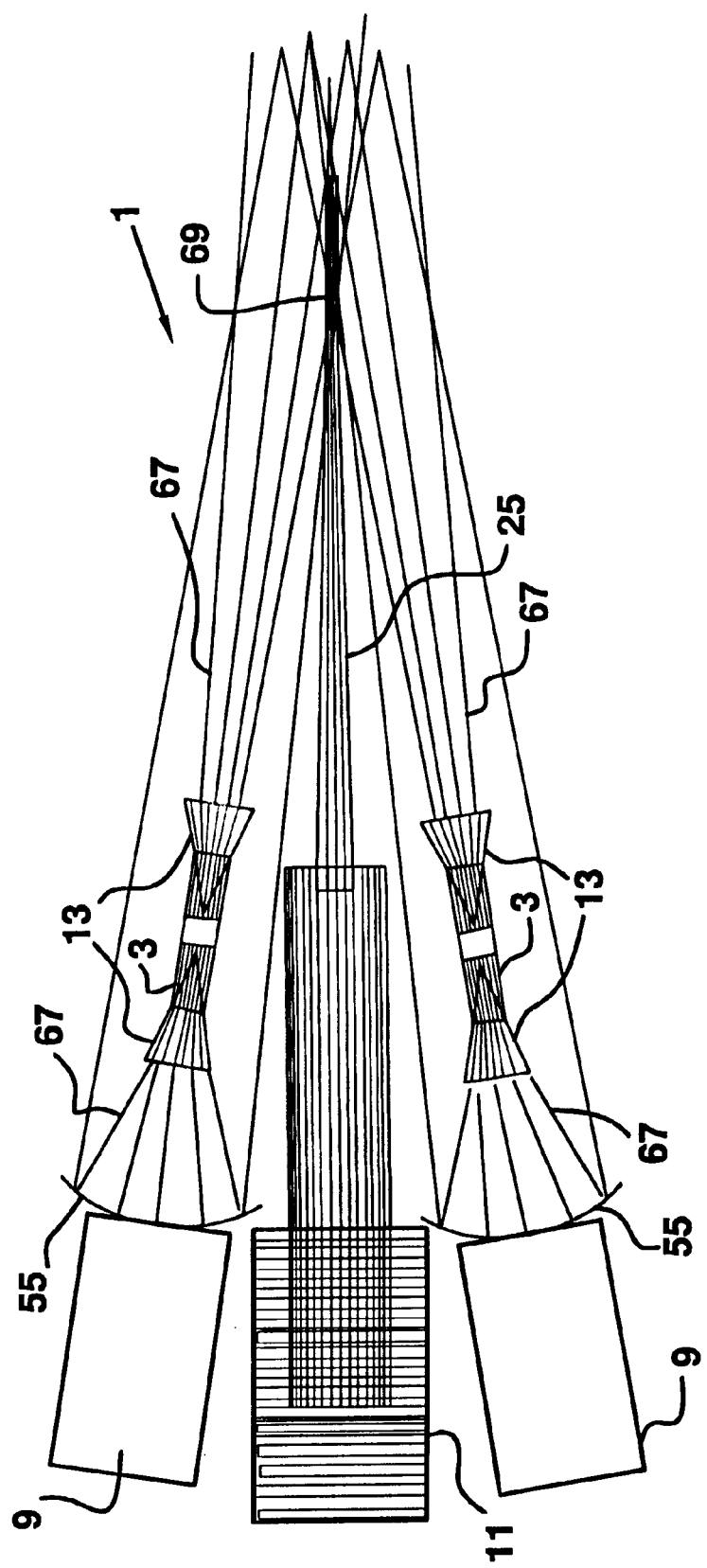
FIG. 19 shows a schematic representation of a conventional MFAEPS.

FIG. 19 shows a schematic representation of a conventional MFAEPS 1 with microwave transmitters 9 delivering microwave energy 67 to waveguides 3. The microwaves 67 exit horn antennas 13 when some of the microwave energy 67 is reflected by parabolic reflector antennas 55 to augment the remainder of the microwave energy 67 some distance in front of the MFAEPS 1. An electrode 25 releases a charge from power source 11 to create an ionizing wave 69 of electrons that propagates down the column 5 created by the microwave energy 67. The temperature of the oxygen at the tail of the microwave energy 67 must be about 900 Kelvin to achieve the improved conduction path for the ionizing wave 69 to propagate.

FIG. 20 depicts a schematic representation of a laser 71 with lens system 73 to focus the laser beam 75 that then creates a randomly diffusing plasma zone 77 of breakdown in the atmosphere. The depiction of the plasma zone 77 demonstrates the random nature of breakdown in the absence of a favored pathway having heated oxygen or water molecules.

FIG. 21 shows a schematic representation of a Laser Augmented MFAEPS 79. The Laser Augmented MFAEPS 79 includes microwave transmitters 9 delivering microwave energy 67 to waveguides 3. The microwaves 67 exit horn antennas 13 when some of the microwave energy 67 is reflected by parabolic reflector antennas 55 to augment the remainder of the microwave energy 67 some distance in front of the Laser Augmented MFAEPS 79. A laser 71 emits through lens system 73 a focused laser beam 75 which creates an ionizing wave 69 that propagates down the column 5 created by the microwave energy 67.

While the invention has been described with reference to specific embodiments, modifications and variations of the invention may be constructed without departing from the scope of the invention, which is defined in the following claims.

I claim:

1. A system for projecting energy using microwave radiation comprising an atmospheric channel extending from the system, a transmitter for generating microwave radiation at a frequency of 22 GHz, a waveguide connected to the transmitter by a first cable for receiving and directing the microwave radiation from the transmitter, a power supply connected to the transmitter, an antenna connected to the waveguide for conducting and projecting microwave energy at the frequency of 22 GHz for exciting and heating water molecules in the channel, an electrode placed in the channel for releasing a charge into the channel, and an electric charge source connected to the electrode by a second cable, for delivering a charge to the electrode.

2. The system of claim 1, further comprising a waterproof housing encasing the transmitter, waveguide, first cable, power supply, electric charge source and second cable.

3. A system for projecting energy using microwave radiation comprising an atmospheric channel extending from the system, a first transmitter for generating microwave radiation at a first frequency, a first waveguide connected to the first transmitter by a first cable for receiving and directing the microwave radiation from the first transmitter, a first power supply connected to the first transmitter, a first antenna connected to the first waveguide for conducting and projecting microwave energy at the first frequency for exciting and heating gas molecules in the channel, a second transmitter for generating microwave radiation at a second frequency, a second waveguide connected to the second transmitter by a second cable for receiving and directing the microwave radiation from the second transmitter, a second power supply connected to the second transmitter, a second antenna connected to the second waveguide for conducting and projecting microwave energy at the second frequency for exciting and heating gas molecules in the channel, an electrode placed in the channel for releasing a charge into the channel, and an electric charge source connected to the electrode by a third cable, for delivering a charge to the electrode.

4. The system of claim 3, wherein the first frequency is a resonant frequency of oxygen.

5. The system of claim 3, wherein the first frequency is between 57 GHz and 63 GHz.

6. The system of claim 3, wherein the first frequency is 60 GHz.

7. The system of claim 3, wherein the first frequency is 118 GHz.

8. The system of claim 3, wherein the second frequency is a resonant frequency of water.

9. The system of claim 3, wherein the second frequency is 22 GHz.

10. A system for projecting energy using microwave radiation comprising an atmospheric channel extending from the system, a first transmitter for generating microwave radiation at a first frequency, a first waveguide connected to the first transmitter by a first cable for receiving and directing the microwave radiation from the first transmitter, a first power supply connected to the first transmitter, a first antenna connected to the first waveguide for conducting and projecting microwave energy at the first frequency for exciting and heating gas molecules in the channel, a second transmitter for generating microwave radiation at a second frequency, a second waveguide connected to the second transmitter by a second cable for receiving and directing the microwave radiation from the second transmitter, a second power supply connected to the second transmitter, a second antenna connected to the second waveguide for conducting and projecting microwave energy at the second frequency for exciting and heating gas molecules in the channel, and a laser placed in the channel for releasing a beam of energy into the channel.

11. The system of claim 10, wherein the first frequency is a resonant frequency of oxygen.

12. The system of claim 10, wherein the first frequency is between 57 GHz and 63 GHz.

13. The system of claim 10, wherein the first frequency is 60 GHz.

14. The system of claim 10, wherein the first frequency is 118 GHz.

15. The system of claim 10, wherein the second frequency is a resonant frequency of water.

16. The system of claim 10, wherein the second frequency is 22 GHz.

17. A system for projecting energy using microwave radiation comprising an atmospheric channel extending from the system, a transmitter for generating microwave radiation, a waveguide connected to the transmitter by a first cable for receiving and directing the microwave radiation from the transmitter, a power supply connected to the transmitter, a first antenna connected to the waveguide for conducting and projecting microwave energy for exciting and heating water molecules in the channel, the first antenna having a small aperture to produce wide half-power band-widths, a second antenna connected to the waveguide for conducting and projecting microwave energy for exciting and heating water molecules in the channel, the second antenna having a large aperture to produce narrow half-power band-widths, an electrode placed in the channel for releasing a charge into the channel, and an electric charge source connected to the electrode by a second cable, for delivering a charge to the electrode.

18. A system for projecting energy using microwave radiation comprising an atmospheric channel extending from the system, a transmitter for generating microwave radiation, a waveguide connected to the transmitter by a first cable for receiving and directing the microwave radiation from the transmitter, a power supply connected to the transmitter, a first antenna connected to the waveguide for conducting and projecting microwave energy for exciting and heating water molecules in the channel, a parabolic reflector placed behind and oriented in the same direction as the first antenna having a focal point some distance in front of the first antenna, a second antenna connected to the waveguide for conducting and projecting microwave energy into the parabolic reflector, an electrode placed in the channel for releasing a charge into the channel, and an electric charge source connected to the electrode by a second cable, for delivering a charge to the electrode.

19. The system of claim 18, further comprising two or more antennas connected to the waveguide conducting and projecting microwave energy into the parabolic reflector.

20. The system of claim 18, further comprising a second electrode in the channel.

21. A system for projecting energy using microwave radiation comprising an atmospheric channel extending from the system, a transmitter for generating microwave radiation, a waveguide connected to the transmitter by a first cable for receiving and directing the microwave radiation from the transmitter, a power supply connected to the transmitter, a first antenna connected to the waveguide for conducting and projecting microwave energy for exciting and heating water molecules in the channel, a parabolic reflector placed behind and oriented in the same direction as the first antenna having a focal point some distance in front of the first antenna, two or more side antennae connected to the waveguide placed on either side of the parabolic reflector for conducting and projecting microwave energy into multiple side reflectors placed in front of the side antennae for reflecting the microwave energy from the side antennae into the parabolic reflector, an electrode placed in the channel for releasing a charge into the channel, and an electric charge source connected to the electrode by a second cable, for delivering a charge to the electrode.

22. The system of claim 21, wherein there are four side antennae.

23. A system for projecting energy using microwave radiation comprising an atmospheric channel extending from the system, a transmitter for generating microwave radiation, a waveguide connected to the transmitter by a first cable for receiving and directing the microwave radiation from the transmitter, a power supply connected to the transmitter, a first antenna connected to the waveguide for conducting and projecting microwave energy for exciting and heating molecules in the channel, a slotted waveguide phased array antenna panel connected to the waveguide for conducting and projecting microwave energy into the channel, the slotted waveguide phased array antenna placed near the first antenna and oriented to project microwave energy in the same direction as the first antenna, an electrode placed in the channel for releasing a charge into the channel, and an electric charge source connected to the electrode by a second cable, for delivering a charge to the electrode.

24. The system of claim 23, further comprising two slotted waveguide phased array antenna panels placed on either side of the first antenna and oriented to project microwave energy in the same direction as the first antenna.

* * * * *